(12) United States Patent
Court et al.

(10) Patent No.: US 8,535,416 B2
(45) Date of Patent: Sep. 17, 2013

(54) METHOD FOR ELIMINATING MERCURY FROM A GAS CONTAINING $CO_2$ AND OXYGEN

(75) Inventors: Philippe Court, Paris (FR); Arthur Darde, Paris (FR); Vladimir Hasanov, Rueil-Malmaison (FR); Christian Monereau, Paris (FR); Serge Moreau, Velizy Villacoublay (FR); Jean-Pierre Tranier, L'Hay-les-Roses (FR)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 302 days.

(21) Appl. No.: 12/668,763

(22) PCT Filed: Jul. 8, 2008

(86) PCT No.: PCT/FR2008/051275
§ 371 (c)(1),
(2), (4) Date: May 5, 2010

(87) PCT Pub. No.: WO2009/010692
PCT Pub. Date: Jan. 22, 2009

(65) Prior Publication Data
US 2010/0212494 A1  Aug. 26, 2010

(30) Foreign Application Priority Data
Jul. 13, 2007  (FR) .................................... 07 56494

(51) Int. Cl.
*B01D 53/02* (2006.01)

(52) U.S. Cl.
USPC ................... 95/134; 95/114; 95/115; 95/133; 96/108

(58) Field of Classification Search
USPC ...................... 95/114, 115, 133, 134; 96/108
See application file for complete search history.

(56) References Cited

U.S. PATENT DOCUMENTS

| | | | |
|---|---|---|---|
| 4,094,777 A | | 6/1978 | Sugier et al. |
| 4,708,853 A | * | 11/1987 | Matviya et al. ............... 423/210 |
| 4,909,926 A | | 3/1990 | Yan |
| 5,281,258 A | * | 1/1994 | Markovs .......................... 95/120 |
| 6,439,138 B1 | * | 8/2002 | Teller et al. .................... 110/345 |
| 7,048,781 B1 | | 5/2006 | Lovell |
| 7,708,804 B2 | * | 5/2010 | Darde et al. ..................... 95/129 |
| 2003/0104937 A1 | | 6/2003 | Sinha |
| 2003/0126989 A1 | * | 7/2003 | Bancon et al. .................... 95/96 |
| 2007/0122327 A1 | | 5/2007 | Yang et al. |
| 2007/0234902 A1 | * | 10/2007 | Fair et al. ......................... 95/134 |
| 2007/0243119 A1 | * | 10/2007 | Downs et al. ................. 423/210 |
| 2009/0013871 A1 | * | 1/2009 | Darde et al. ..................... 95/129 |

OTHER PUBLICATIONS

Sangras, R., Chatel-Pelage, F., Pranda, P., et al.: "Oxycombustion Process in Pulverized Coal-Fired Boilers: A Promising Technology for CO2 Capture", The 29th International Conference on Coal Utilization and Fuel Systems, 2004, pp. 1-12, XP002471956, Clearwater, FL, p. 6, paragraph 3; p. 7, paragraph 4; figure 1.
PCT Search Report for PCT/FR2008/051275.
M. Jeguirim, V. Tschamber, J.F. Brilhac, and P. Ehrburger, "Interaction mechanism of NO2 with carbon black: Effect of surface oxygen complexes," Journal of Analytical and Applied Pyrolysis, Mar. 16, 2004 (pp. 171-181).
J.K. Neathery, A.M. Rubel, and J.M. Stencel, "Uptake of NOx by Activated Carbons: Bench Scale and Pilot-Plant Testing," Center for Applied Energy Research, University of Kentucky, Mar. 31, 1997 (pp. 1321-1327).

* cited by examiner

*Primary Examiner* — Christopher P Jones

(57) ABSTRACT

A method for the purification of a feed gas stream at a pressure $\geq 3$ bar, comprising at least 1% by volume of oxygen ($O_2$) and at least 75% by volume of $CO_2$ and mercury, enabling the mercury to be eliminated is provided.

19 Claims, No Drawings

METHOD FOR ELIMINATING MERCURY FROM A GAS CONTAINING $CO_2$ AND OXYGEN

This application is a §371 of International PCT Application PCT/FR2008/051275, filed Jul. 8, 2008.

FIELD OF THE INVENTION

The invention relates to a method for the purification of a feed gas stream at a pressure $\geq 3$ bar, comprising at least 1% by volume of oxygen ($O_2$) and at least 75% by volume of $CO_2$ and mercury, enabling the mercury to be eliminated.

BACKGROUND

More precisely, the aim of the invention is to develop a method of treating $CO_2$ coming from an oxy-combustion process (i.e. combustion with pure oxygen or with a gas leaner in nitrogen than air).

Now, fossil fuel and/or biomass combustion gases or waste incineration gases or gases coming from glass furnaces predominantly contain heavy metals, such as mercury, organic pollutants and compounds of the SOx and NOx type.

The danger of mercury pollution is known, since mercury is a toxic element. In humans, exposure to mercury may lead to neurological and growth disorders.

Mercury emissions may remain in the atmosphere from a few hours to several years.

Furthermore, it is essential to provide a mercury extraction method for the treatment of combustion gases.

It is known that certain metals, for example gold, silver and copper, form amalgams with mercury and that this property is used for assaying mercury.

However, the extraction of mercury by these metals is not used on an industrial scale because of the hourly volume to be treated.

Another possibility is to wash coal before combustion. However, the washing operations make it possible to remove only between 0 and 60% of the mercury.

Other solutions, such as electrostatic precipitators or filter membrane separators, have been tried out.

However, no trial has been conclusive.

Moreover, U.S. Pat. No. 4,094,777 describes a method for capturing mercury in gas or liquid phase by fixing the mercury on an adsorbent mass comprising copper sulfide and optionally silver sulfide deposited on a support based on silica and/or alumina. The method is a fixed bed method that can be used at temperatures from −50° C. to 200° C. and at pressures up to 200 bar. It states that this method is applicable to the demercuration of natural gas or electrolytic hydrogen. The example given relates to natural gas containing methane, hydrocarbons up to C5, $CO_2$ and nitrogen.

It has also been disclosed that regeneration may take place with air at a temperature of 200° C. and above, and that it may be necessary to resulfurize the material.

U.S. Pat. No. 4,909,926 describes a method for capturing mercury in a hydrocarbon stream. The materials cited comprise Ag and CuS, the supports being alumina or $SiO_2$.

When an alumina support is used, regeneration takes place with a gas containing oxygen, the oxygen being purged before reutilization. This document mentions that this purge must take place at high temperature in order to avoid oxide formation. Finally, it mentions that the method may be applied in the presence of hydrocarbons, hydrogen, $H_2S$, $N_2$, $H_2O$ and $CO_2$.

Thus, it would seem that the presence of oxygen in a gas to be treated makes its demercuration via adsorption on a product containing copper sulfide and/or silver or silver sulfide inapplicable. Oxygen is actually described as being a regeneration, therefore mercury desorption, agent, and, at low temperature, as an oxidizing agent and deactivation agent.

Starting from this situation, a problem that arises is how to provide an improved method of purifying a gas stream containing $CO_2$, at least 1% oxygen, and mercury so as to obtain a mercury-depleted gas.

A similar problem arises in the case of gas streams containing NOx and/or SOx, since these compounds have oxidizing properties, liable to react with the adsorbent.

SUMMARY OF THE INVENTION

Now, unexpectedly, the inventors have discovered that one solution according to the invention is a method for the purification of a feed gas stream at a pressure $\geq 3$ bar, comprising at least 1 vol % oxygen ($O_2$) and at least 75 vol % $CO_2$ and mercury, characterized in that it includes an adsorption purification step carried out at a temperature <120° C., in which method at least one fixed adsorbent bed comprising a sulfur-containing and/or silver-containing adsorbent is used so as to at least partially eliminate the mercury.

Depending on the case, the method according to the invention may have one of the following features:

- the feed gas stream comprises between 1 and 6 vol % oxygen;
- the feed gas stream comprises up to 5000 ppm by volume of NOx and/or Sox, preferably less than 1000 ppm and even more preferably less than 100 ppm;
- the feed gas stream is not saturated with water;
- the feed gas stream contains less than 1000 ppm of water, preferably less than 100 ppm and even more preferably less than 1 ppm;
- the feed gas stream is at a pressure $\geq 10$ bar;
- the purification step is carried out at a temperature <100° C., more preferably at a temperature between 5° C. and 80° C.;
- the sulfur-containing and/or silver-containing adsorbent includes an organic or inorganic support;
- the organic support is active carbon;
- the inorganic support is chosen from the group comprising: porous glasses; silica; alumina; silica-alumina; silicates; aluminates; and aluminosilicates;
- said fixed adsorbent bed comprises:
  (a) a dispersant or a solid support, chosen from the group comprising silica, porous glass, alumina, silica-alumina; silicates; aluminates; and aluminosilicates,
  (b) copper, at least 30% of which is in sulfide form and the total copper oxide/copper sulfide weight of which represents 2 to 65% of the weight of the adsorbent mass of the fixed bed,
  (c) 0 to 5% by weight of silver;
- said fixed adsorbent bed has a specific surface area of between 20 and 1300 $m^2/g$;
- 80% of the copper is in the form of copper sulfide;
- said method makes it possible to treat between 000 and 20 000 vvh of the feed gas stream, where vvh=volume of feed gas entering the adsorber per volume of adsorber per hour; also, the unit is h−1 since the volume of gas is measured by convention under standard conditions (1.013 bar abs and 0° C.); and
- the feed gas stream is an oxy-combustion flue gas stream.

In certain cases, the adsorbent bed comprising a sulfur-containing and/or silver-containing adsorbent is a guard bed.

DETAILED DESCRIPTION OF THE INVENTION

For a further understanding of the nature and objects for the present invention, reference should be made to the detailed description, taken in conjunction with the accompanying drawing, in which like elements are given the same or analogous reference numbers and wherein:

Porous glass is a chemically inert material, highly resistant in particular to bases and acids and having good physical (crush, attrition) properties.

It is essentially composed of $SiO_2$, generally >90% by weight, preferably >95%, and may contain, in minor amounts, $B_2O_3$, $Na_2O$, $Al_2O_3$, $ZrO_2$ and/or other metal oxides.

This porous glass has the particular feature, as its name would suggest, of having a high internal void content, generally greater than 25% by volume, in the form of pores varying in dimensions according to the products, thereby enabling it to develop internal surface areas of several hundred $m^2$ per gram.

To give an example, mention may be made of VYCOR Brand Porous Glass 7930 from Corning Incorporated, which has a pore volume of 28%, an internal surface area of 250 $m^2$/gram and a mean pore diameter of 40 Å (4 nanometers).

Contrary to the teaching that may be drawn from the prior art, it appears that a mixture containing at least 1% oxygen by volume and at least 75% $CO_2$ by volume may be demercurated by fixing the mercury on a sulfur-containing and/or silver-containing adsorbent mass.

It is possible that the high $CO_2$ partial pressure compared with the oxygen partial pressure limits the reactivity of the latter constituent and that any loss of effectiveness can be compensated for by a longer contact time (or a lower volume per volume per hour).

The total-pressure and temperature effects were not systematically studied, since said method proves to be industrially operational under normal operating conditions, namely a $CO_2$ content by volume of 75% or higher, an oxygen content by volume of between 1 and 6%, a pressure of 3 bar absolute or higher and a temperature below 250° C., preferably below 150° C. and more preferably still between 5 and 80° C.

NOx and SOx levels up to 5000 ppm by volume in the gas stream treated by the method according to the invention are acceptable.

The support for the metal-based active compound, predominantly Cu and/or Ag but possibly containing minor amounts of other metals such as Fe, Zr and Zn, may be active carbon, alumina, silica, silica-alumina, silicates, aluminates, or alumino silicates.

As described in U.S. Pat. No. 4,094,777, mercury elimination may take place in a single adsorber or, for example, in two adsorbers in series. The installed charge of adsorbent will preferably be able to operate without intervention for a minimum of 6 months. In the case of adsorbers in series, it is possible to replenish the charges by half. The new charge is then used downstream of the charge remaining in service.

In a variant of the method, the mercury-polluted charge may be regenerated in situ. In the presence of a large amount of mercury (of the order of one milligram per $m^3$ of gas for example), it may be advantageous to install two adsorbers in parallel, one in service, the other then undergoing regeneration.

In general, the adsorption purification step may include other adsorption purification processes than merely the trapping of mercury—other heavy metals, such as for example arsenic, may be trapped. In this case, a second bed, suitable for this trapping, will be placed either upstream or downstream of the bed intended for mercury trapping. It is also possible to devise a mixture, whether homogeneous or not, of various adsorbents, at least one corresponding to mercury trapping. One and the same product may also be used for mercury and other heavy metals. The purification step may include drying the feed gas either upstream or downstream of the demercuration.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A method for the purification of a feed gas stream comprising between 1 and 6 vol % oxygen ($O_2$) and at least 75 vol % $CO_2$ and mercury, at a pressure $\geq 3$ bar, comprising an adsorption purification step carried out at a temperature <120° C., in which at least one fixed adsorbent bed comprising a sulfur-containing and/or silver-containing adsorbent is used so as to at least partially eliminate the mercury.

2. The purification method of claim 1, wherein the feed gas stream comprises up to 5000 ppm by volume of NOx and/or SOx.

3. The purification method of claim 2, wherein the feed gas stream comprises less than 1000 ppm by volume of NOx and/or SOx.

4. The purification method of claim 2, wherein the feed gas stream comprises less than 100 ppm by volume of NOx and/or SOx.

5. The method of claim 1, wherein the feed gas stream is not saturated with water.

6. The method of claim 1, wherein the feed gas stream contains less than 1000 ppm of water.

7. The method of claim 6, wherein the feed gas stream contains less than 100 ppm of water.

8. The method of claim 6, wherein the feed gas stream contains less than 1 ppm of water.

9. The purification method of claim 1, wherein the feed gas stream is at a pressure $\geq 10$ bar.

10. The method of claim 1, wherein the purification step is carried out at a temperature <100° C.

11. The method of claim 10, wherein the purification step is carried out at a temperature between 5° C. and 80° C.

12. The method of claim 1, wherein the sulfur-containing and/or silver-containing adsorbent includes an organic support.

13. The method of claim 12, wherein the organic support is active carbon.

14. The method of claim 1, wherein the sulfur-containing and/or silver-containing adsorbent includes an inorganic support.

15. The method of claim 14, wherein the inorganic support is chosen from the group consisting of porous glasses; silica; alumina; silica-alumina; silicates; aluminates; and aluminosilicates.

16. The method of claim 1, wherein said fixed adsorbent bed comprises:

(a) a dispersant or a solid support, chosen from the group consisting of silica, porous glass, alumina, silica-alumina; silicates; aluminates; and aluminosilicates;

(b) copper, at least 30% of which is in sulfide form and the total copper oxide/copper sulfide weight of which represents 2 to 65% of the weight of the adsorbent mass of the fixed bed;
(c) 0 to 5% by weight of silver.

17. The method of claim 1, wherein said fixed adsorbent bed has a specific surface area of between 20 and 1300 $m^2/g$.

18. The method of claim 1, wherein said method makes it possible to treat between 4 000 and 20 000 vvh of the feed gas stream.

19. The method of claim 1, wherein the feed gas stream is an oxy-combustion flue gas stream.

* * * * *